(12) United States Patent
Sheldon et al.

(10) Patent No.: US 9,203,844 B2
(45) Date of Patent: Dec. 1, 2015

(54) VISUAL REPRESENTATION FOR PERMISSION TO CONTACT

(71) Applicant: Bank of America Corporation, Charlotte, NC (US)

(72) Inventors: Andrew Sheldon, Mountain Top, PA (US); Ryan Scott Heller, Middletown, DE (US); David Luke Hallam, Newark, DE (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 176 days.

(21) Appl. No.: 14/068,639

(22) Filed: Oct. 31, 2013

(65) Prior Publication Data

US 2015/0121241 A1 Apr. 30, 2015

(51) Int. Cl.
 *G06F 3/00* (2006.01)
 *H04L 29/06* (2006.01)
 *G06Q 30/00* (2012.01)
(52) U.S. Cl.
 CPC .............. *H04L 63/101* (2013.01); *G06Q 30/01* (2013.01)
(58) Field of Classification Search
 CPC .......................... G06Q 30/0201; H04L 63/101
 USPC ........................................................ 715/739
 See application file for complete search history.

(56) References Cited

U.S. PATENT DOCUMENTS

| | | | |
|---|---|---|---|
| 4,774,664 A | 9/1988 | Campbell et al. | |
| 5,594,791 A | 1/1997 | Szlam et al. | |
| 5,774,663 A | 6/1998 | Randle et al. | |
| 5,956,393 A | 9/1999 | Tessler et al. | |
| 6,612,928 B1 | 9/2003 | Bradford et al. | |
| 6,985,673 B2 | 1/2006 | Molldrem, Jr. | |
| 7,046,789 B1 | 5/2006 | Anderson et al. | |
| 7,191,150 B1 | 3/2007 | Shao et al. | |
| 7,383,215 B1 | 6/2008 | Navarro et al. | |

(Continued)

FOREIGN PATENT DOCUMENTS

| | | |
|---|---|---|
| GB | 2489447 | 10/2012 |
| WO | WO 2007/084732 A2 | 7/2007 |
| WO | WO 2008/011555 A2 | 1/2008 |

OTHER PUBLICATIONS

Great Britain Combined Search and Examination Report Under Sections 17 & 18(3), for Application No. GB1417875.0, dated Mar. 9, 2015, 8 pages.

(Continued)

*Primary Examiner* — William Titcomb
(74) *Attorney, Agent, or Firm* — Michael A. Springs; Moore & Van Allen PLLC; Anup Shrinivasan

(57) ABSTRACT

Embodiments of the invention include systems and methods for assigning visual representation to contacts. The embodiments include receiving selection criteria, identifying data associated with a plurality of customers meeting the selection criteria, wherein each of the customers is associated with one or more contacts, determining that at least one contact associated with each customer comprises one or more contact statuses, and assigning one or more indicators to the at least one contact based on the one or more statuses. In particular embodiments, the one or more statuses are related to a contact locked status, a contact external request status, a contact geography status, a contact time period status, a contact velocity status, and/or a permission-to-communicate status.

22 Claims, 6 Drawing Sheets

(56) References Cited

U.S. PATENT DOCUMENTS

| | | | |
|---|---|---|---|
| 7,398,226 | B2 | 7/2008 | Haines et al. |
| 7,509,653 | B2 | 3/2009 | Das et al. |
| 7,513,419 | B1 | 4/2009 | Crews et al. |
| 7,654,452 | B2 | 2/2010 | Gravelle |
| 7,672,870 | B2 | 3/2010 | Haines et al. |
| 7,702,575 | B1 | 4/2010 | Lofton et al. |
| 7,941,752 | B2* | 5/2011 | Ozugur et al. ............... 715/739 |
| 8,358,771 | B1* | 1/2013 | Moore et al. ............. 379/265.01 |
| 8,379,834 | B2* | 2/2013 | Weinstein et al. ....... 379/266.07 |
| 8,462,918 | B2 | 6/2013 | Segall et al. |
| 8,583,496 | B2 | 11/2013 | Yoo et al. |
| 8,867,732 | B1 | 10/2014 | Hoen, IV |
| 2002/0056000 | A1* | 5/2002 | Albert Coussement ...... 709/225 |
| 2002/0077937 | A1 | 6/2002 | Lyons et al. |
| 2002/0080413 | A1 | 6/2002 | Sommerer |
| 2002/0087385 | A1 | 7/2002 | Vincent |
| 2003/0009530 | A1* | 1/2003 | Philonenko et al. ......... 709/206 |
| 2003/0074342 | A1 | 4/2003 | Curtis |
| 2004/0267595 | A1 | 12/2004 | Woodings et al. |
| 2005/0130641 | A1* | 6/2005 | Lorraine Scott ............. 455/418 |
| 2005/0249209 | A1* | 11/2005 | Fotta et al. .................... 370/389 |
| 2005/0251408 | A1 | 11/2005 | Swaminathan et al. |
| 2007/0127691 | A1 | 6/2007 | Lert, Jr. |
| 2007/0156557 | A1 | 7/2007 | Shao et al. |
| 2007/0187183 | A1 | 8/2007 | Saigh et al. |
| 2008/0014908 | A1 | 1/2008 | Vasant |
| 2008/0032679 | A1 | 2/2008 | Purontaus et al. |
| 2008/0052209 | A1 | 2/2008 | Bowne et al. |
| 2008/0077525 | A1 | 3/2008 | Willey et al. |
| 2009/0037306 | A1 | 2/2009 | Hill |
| 2009/0138283 | A1 | 5/2009 | Brown |
| 2010/0153487 | A1 | 6/2010 | Greven et al. |
| 2010/0287131 | A1* | 11/2010 | Church .......................... 706/47 |
| 2010/0305988 | A1 | 12/2010 | Agarwal et al. |
| 2011/0087510 | A1 | 4/2011 | Putra et al. |
| 2011/0218853 | A1* | 9/2011 | Verbil ........................ 705/14.45 |
| 2011/0231874 | A1* | 9/2011 | Goode et al. .................... 725/37 |
| 2012/0110467 | A1* | 5/2012 | Blake et al. ................... 715/745 |
| 2012/0150921 | A1* | 6/2012 | Yamakawa .................... 707/805 |
| 2012/0207294 | A1* | 8/2012 | Katpelly et al. ......... 379/201.02 |
| 2013/0060587 | A1* | 3/2013 | Bayrak et al. ................ 705/7.11 |
| 2013/0090965 | A1* | 4/2013 | Rivere ........................ 705/7.15 |
| 2013/0246930 | A1* | 9/2013 | Paushkina et al. ............ 715/739 |
| 2014/0157138 | A1* | 6/2014 | Kuscher et al. ............... 715/739 |
| 2014/0164502 | A1* | 6/2014 | Khodorenko et al. ........ 709/204 |
| 2014/0188809 | A1 | 7/2014 | Kau et al. |
| 2015/0055772 | A1* | 2/2015 | Klemm et al. ........... 379/265.12 |

OTHER PUBLICATIONS

Great Britain Combined Search Report Under Section 17(5)(B) and Abbreviated Examination Report Under Section 18(3), for Application No. GB 1417896.6, dated Mar. 23, 2015, 8 pages.

Great Britain Combined Search Report Under Section 17(5)(B) and Abbreviated Examination Report Under Section 18(3), for Application No. GB 1417889.1, dated Mar. 19, 2015, 6 pages.

Great Britain Combined Search Report Under Section 17(5)(B) and Abbreviated Examination Report Under Section 18(3), for Application No. GB 1417882.6, dated Mar. 23, 2015, 6 pages.

Great Britain Combined Search and Examination Report Under Sections 17 & 18(3), for Application No. GB1417894.1, dated Mar. 12, 2015, 6 pages International Preliminary Report on Patentability, issued Feb. 2, 2010 and Written Opinion, dated Dec. 22, 2008 for International Application No. PCT/US/2008/071705, mailed Feb. 11, 2010, 5 pages.

Original article was cited by United States Patents & Trademark Examiner in U.S. Pat. No. 7,702,575, PR Newswire article "Alltel Provides Access to Early Indicators Loss Migration Tool", New York, Mar. 3, 1998, p. 1; Article located in Mortgage Banking, Apr. 1998, 58, 7, ProQuest Central, p. 99.

* cited by examiner

FIG. 6

VISUAL REPRESENTATION FOR PERMISSION TO CONTACT

BACKGROUND

Representatives of institutions, such as financial institutions, often contact customers for various reasons. For example, an institution may contact a customer regarding a specific account or to provide a special offer. Institutions, however, want to efficiently contact customers while complying with business policies and rules. Many different policies affect whether a customer should be contacted, including the frequency of contact, requests by customers, and general information relating to customers' lives. For these reasons, there is a need for a system that automatically generates a contact list that both efficiently provides contacts for desired customers while complying with business and legal rules and regulations.

SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Provided herein are embodiments directed to systems for assigning visual representation to contacts. The systems include a computer apparatus including a processor and a memory; and a software module stored in the memory, comprising executable instructions that when executed by the processor cause the processor to receive selection criteria. In some embodiments of the systems, the executable instructions cause the processor to identify data associated with a plurality of customers meeting the selection criteria, wherein each of the customers is associated with one or more contacts. In some embodiments, the executable instructions cause the processor to determine that at least one contact associated with each customer comprises one or more contact statuses. In some embodiments, the executable instructions cause the processor to assign one or more indicators to the at least one contact based on the one or more statuses. In some embodiments, the one or more statuses include at least one of a contact locked status, a contact external request status, a contact geography status, a contact time period status, a contact velocity status, and a permission-to-communicate status.

In other embodiments of the systems, the executable instructions cause the processor to assign a first indicator to a first contact of a first account based on the first contact being locked, assign a second indicator to a second contact of a second account based on an external request associated with the second contact, and assign a third indicator to a third contact of the first account based on a velocity range of the third account. In still other embodiments, each of the second indicator and the third indicator comprise the same visual representation and the first indicator comprises an auditory indicator. In some embodiments, at least one of the one or more indicators indicates that communicating with a customer via the first contact is prohibited. In additional embodiments, the executable instructions cause the processor to allow a user to select an exception for the communication prohibition from a user; prompt the user to enter a reason for the exception; and allow the user to communicate with at least one of the plurality of customers based on the exception.

In further embodiments of the systems, at least one of the one or more indicators indicates that communicating with a customer via the first contact is allowed. In some embodiments, the selection criteria are based on a characteristic of the customers. In other embodiments, the executable instructions cause the processor to determine a location associated with the customer; compare the location associated with the customer with a database of currently prohibited locations; and determine that communication with the at least one contact is restricted based on the comparison between the location of the customer and the database of currently prohibited locations; wherein the one or more indicators assigned to the at least one contact indicates the communication restriction.

In additional embodiments of the systems, the executable instructions cause the processor to determine a time period associated with the customer; compare the time associated with the customer with a database of currently prohibited times; determine that communication with the at least one contact is restricted based on the comparison between the location of the customer and the database of currently prohibited locations; wherein the one or more indicators assigned to the at least one contact indicates the communication restriction. In other embodiments, the executable instructions cause the processor to determine a frequency of contact associated with the customer; compare the frequency of contact associated with the customer with a database of currently prohibit frequencies; and determine that communication with the at least one contact is restricted based on the comparison between the frequency of contact of the customer and the database of currently prohibited frequencies; wherein the one or more indicators assigned to the at least one contact indicates the communication restriction. In still other embodiments, the executable instructions cause the processor to identify a requirement to receive permission associated with the customer; determine whether permission has been received; and determine that communication with the at least one contact is restricted when permission has not been received; wherein the one or more indicators assigned to the at least one contact indicates the communication restriction.

Further provided herein are embodiments directed to a computer program product for assigning visual representation to contacts. The computer program product including a non-transitory computer readable storage medium having computer readable program code embodied therewith, the computer readable program code comprising a computer readable program code configured to receive selection criteria. In some embodiments, the computer readable program code includes a computer readable program code configured to identify data associated with a plurality of customers meeting the selection criteria, wherein each of the customers is associated with one or more contacts. In some embodiments, the computer readable program code includes a computer readable program code configured to determine that at least one contact associated with each customer comprises one or more contact statuses. In some embodiments, the computer readable program code includes a computer readable program code configured to assign one or more indicators to the at least one contact based on the one or more statuses. In some embodiments, the one or more statuses include at least one of a contact locked status, a contact external request status, a contact geography status, a contact time period status, a contact velocity status, and a permission-to-communicate status.

In some embodiments of the computer program product, the computer program product further includes a computer readable program code configured to assign a first indicator to a first contact of a first account based on the first contact being locked; assign a second indicator to a second contact of a second account based on an external request associated with the second contact; and assign a third indicator to a third contact of the first account based on a velocity range of the third account. In other embodiments, at least one of the one or more indicators indicates that communicating with a customer via the first contact is prohibited. In still embodiments, the computer program product further includes a computer readable program code configured to allow a user to select an exception for the communication prohibition from a user; prompt the user to enter a reason for the exception; and allow the user to communicate with at least one of the plurality of customers based on the exception. In additional embodiments, at least one of the one or more indicators indicates that communicating with a customer via the first contact is allowed.

Other embodiments relate to methods for assigning visual representation to contacts. In some embodiments, the methods include receiving selection criteria. In some embodiments, the methods include identifying, by a processor, data associated with a plurality of customers meeting the selection criteria, wherein each of the customers is associated with one or more contacts. In some embodiments, the methods include determining, by a processor, that at least one contact associated with each customer comprises one or more contact statuses. In some embodiments, the methods include assigning, by a processor, one or more indicators to the at least one contact based on the one or more statuses. In some embodiments, the one or more statuses include at least one of a contact locked status, a contact external request status, a contact geography status, a contact time period status, a contact velocity status, and a permission-to-communicate status.

In additional embodiments of the methods, the methods include assigning, by a processor, a first indicator to a first contact of a first account based on the first contact being locked; assigning, by a processor, a second indicator to a second contact of a second account based on an external request associated with the second contact; and assigning, by a processor, a third indicator to a third contact of the first account based on a velocity range of the third account. In other embodiments, at least one of the one or more indicators indicates that communicating with a customer via the first contact is prohibited. In still other embodiments, least one of the one or more indicators indicates that communicating with a customer via the first contact is allowed.

Other aspects and features, as recited by the claims, will become apparent to those skilled in the art upon review of the following non-limited detailed description of the invention in conjunction with the accompanying figures.

BRIEF DESCRIPTION OF THE DRAWINGS

Figure 1:
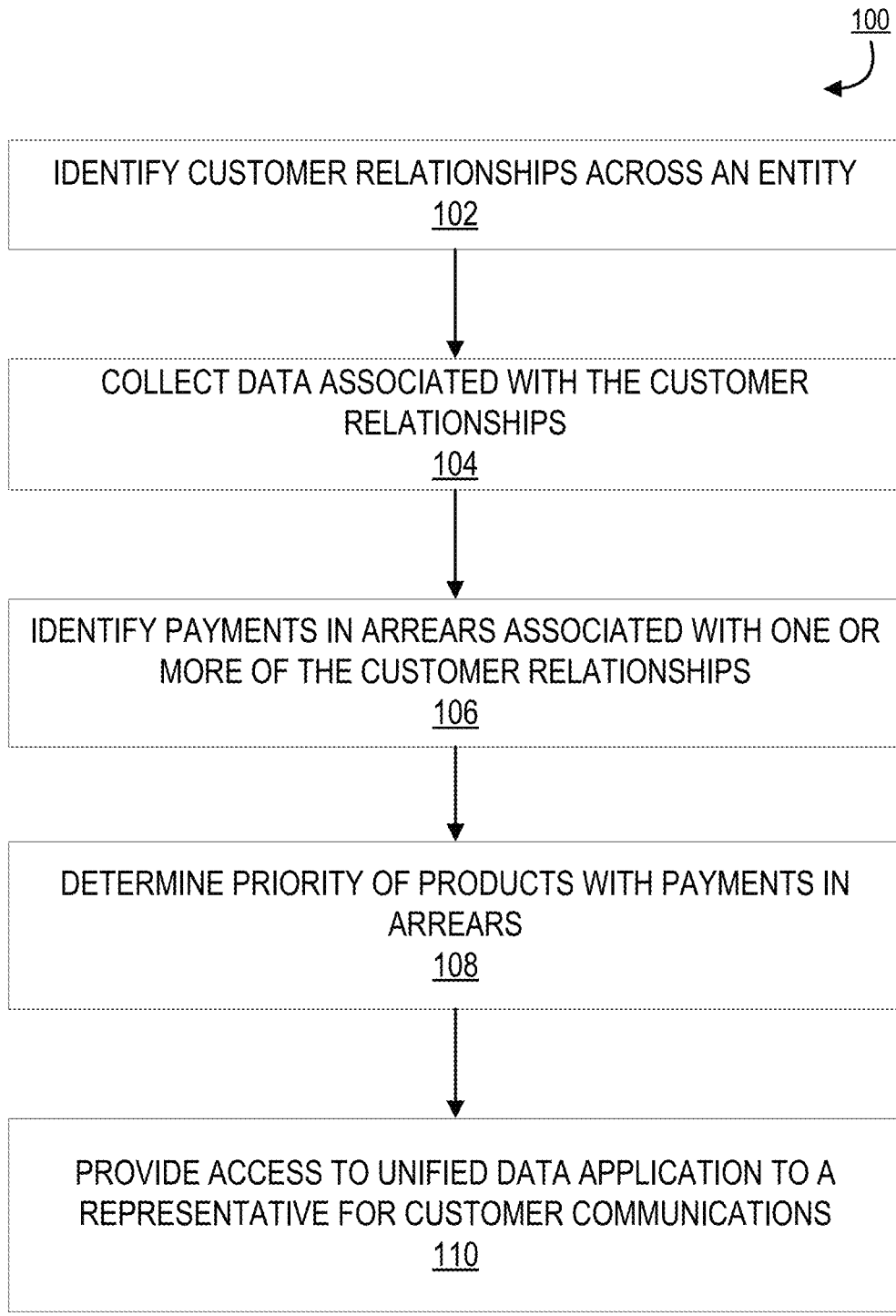
Figure 2:
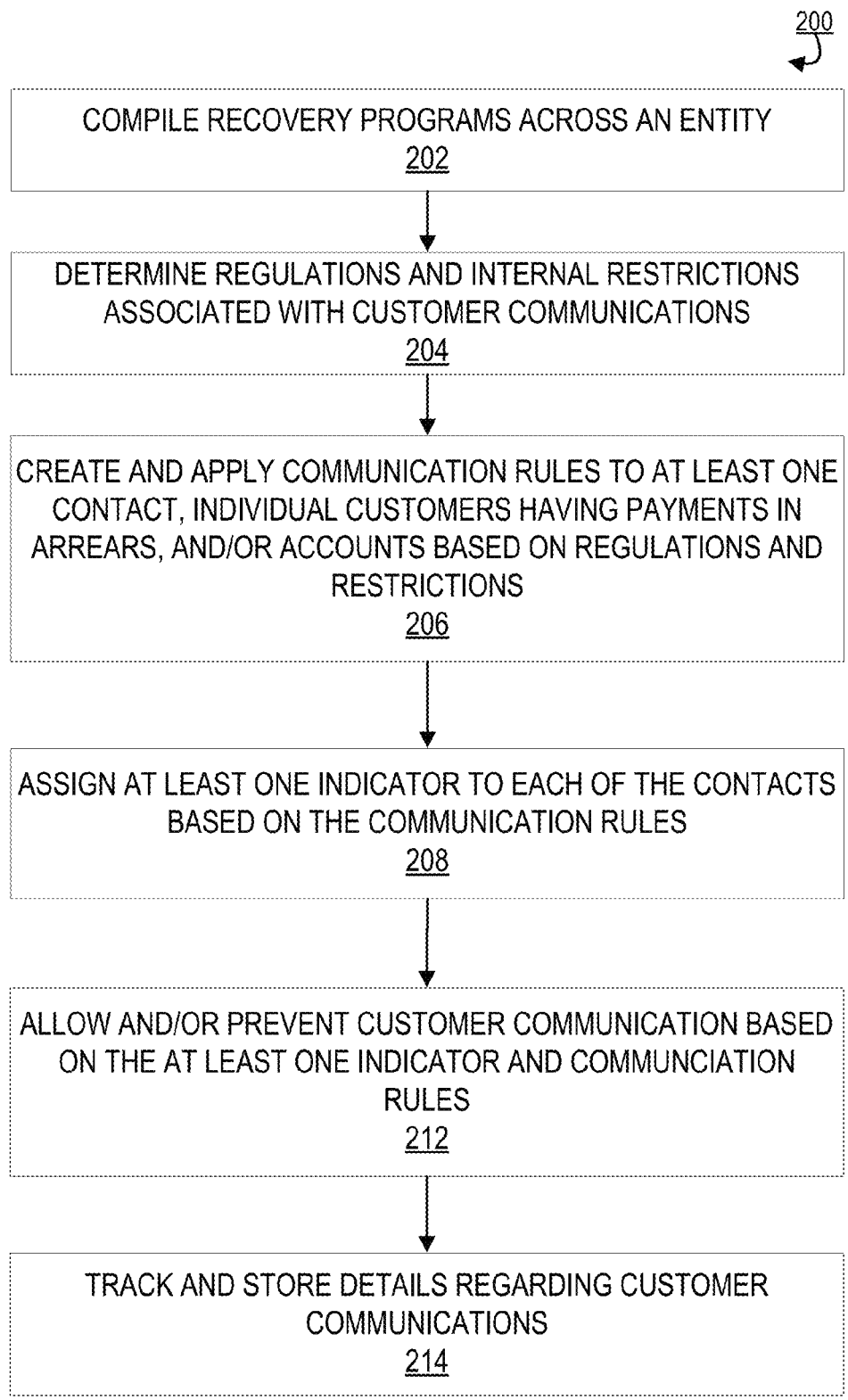
Figure 3:
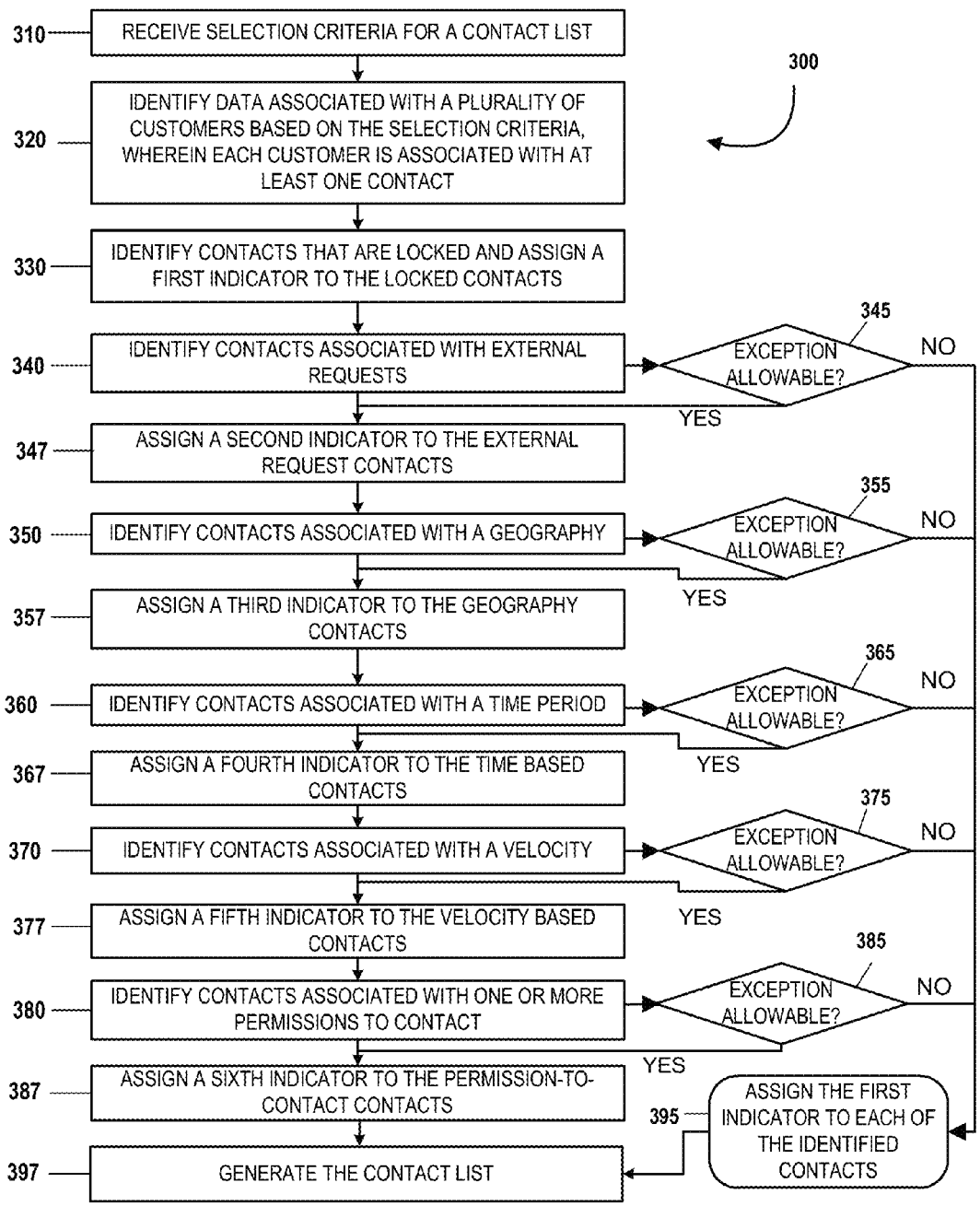
Figure 4:
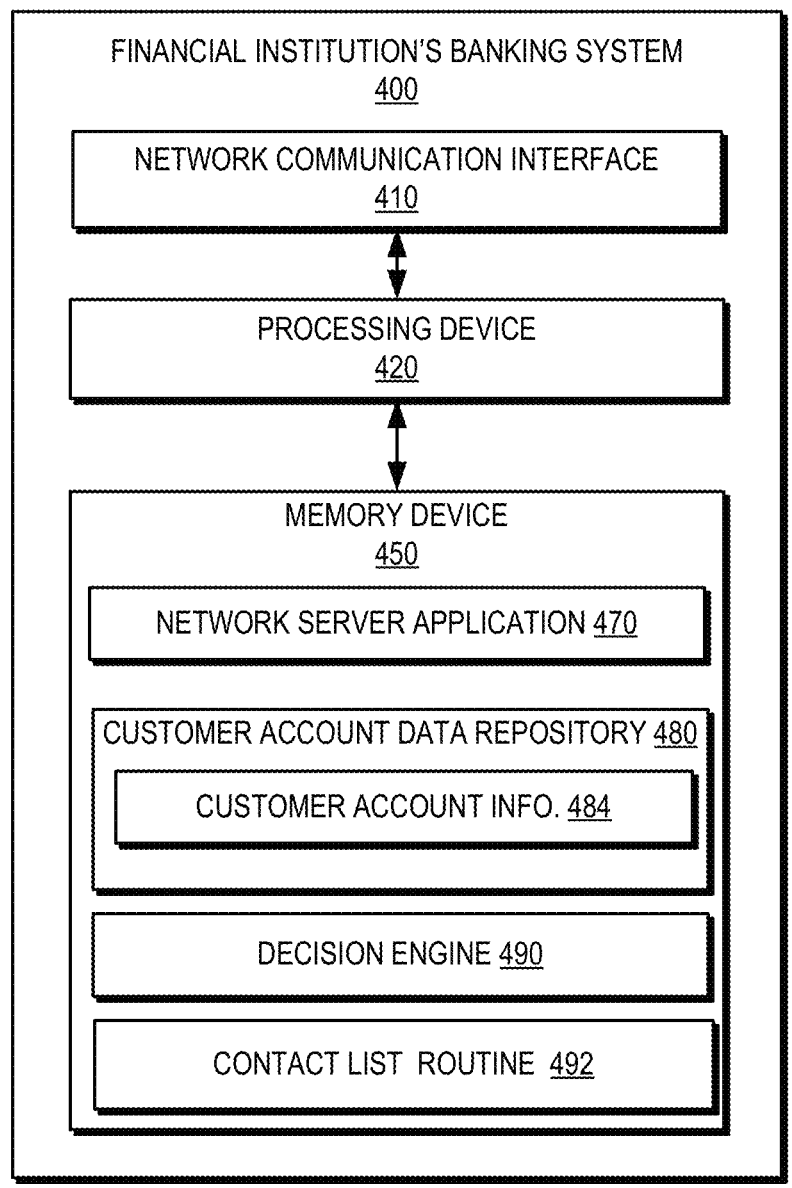
Figure 5:
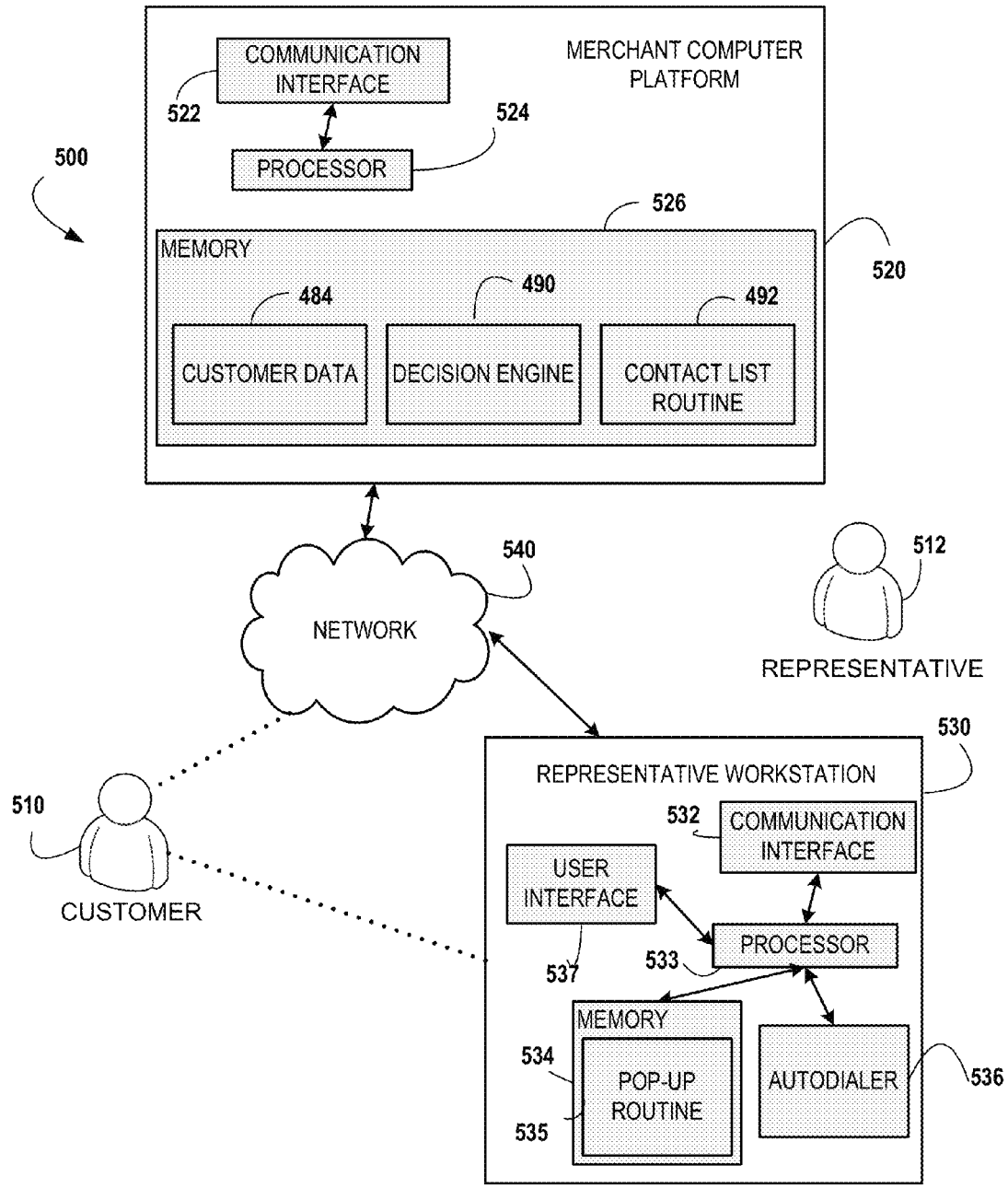

Having thus described embodiments of the invention in general terms, reference will now be made to the accompanying drawings, which are not necessarily drawn to scale, and wherein:

FIG. 1 provides a high level process flow illustrating the unified recovery process, in accordance with one embodiment of the present disclosure;

FIG. 2 provides a high level process flow illustrating the unified recovery system process, in accordance with one embodiment of the present disclosure;

FIG. 3 is a flow diagram illustrating a high-level process flow for a system and method for providing visual representation for permission to contact, in accordance with embodiments of the disclosure;

FIG. 4 is a block diagram illustrating exemplary technical components of a financial institution banking system, in accordance with an embodiment of the present disclosure;

FIG. 5 is a block diagram illustrating exemplary technical components of a system for providing visual representation for permission to contact, in accordance with an embodiment of the present disclosure; and FIG. 6 illustrates an exemplary graphical user interface for providing visual representation for permission to contact.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." It should also be understood that while some embodiments describe the methods or products as comprising one or more elements, the methods or elements may also consist of or consist essentially of the elements disclosed herein.

Although embodiments of the present invention described herein are generally described as involving a merchant, it will be understood that merchant may involve one or more persons, organizations, businesses, institutions and/or other entities such as financial institutions, services providers that implement one or more portions of one or more of the embodiments described and/or contemplated herein.

Apparatus, systems, methods and computer program products are herein disclosed for creating visual or other representation related to contacting customers. Inasmuch as financial institutions generate visual representation for contacts to efficiently contact customers while complying with business and legal requirements, specific embodiments disclosed herein relate to financial institutions. However, such embodiments are exemplary.

FIG. 1 illustrates a high level process flow for a unified recovery process 100 in which the automatic contact lists may be used. As illustrated in block 102, the process 100 begins with identifying customer relationships across an entity. In this way, the system may identify all products that a customer may have with the entity across one or more lines of business within the entity. As such, addresses, affiliates, phone numbers, customer products, products with payments that are in arrears, and any other information that may be associated with a single customer may be gathered across the lines of business of an entity. Next, as illustrated in block 104, the data associated with the customer relationships may be collected and compiled in association with the customer. As such, all relationship data may be stored in association with a customer including those products and/or accounts that are in arrears.

The next step in the process 100, as illustrated in block 106, is to identify payments in arrears associated with the customer. As such, the products or accounts that have payments in arrears that are associated with that particular customer are identified. A product or account with a payment in arrears may be qualified as being in arrears based on the entity itself and/or agreements for payment between the customer and the entity. For example, after the due date for payment for the product or after a predetermined number of days after the due date, the product may be considered by the entity to be in arrears. Furthermore, the accounts or products with payments in arrears for people affiliated with that customer, such as when the customer is a guarantor for the associate or the like, may also be identified by the system. People affiliated with the customer may include friends, family, or the like associated with the customer.

As illustrated in block 108, the system determines the priority of the products with payments in arrears. In this way, the system may determine which products in arrears should take priority over the other products for purposes of recovery of payments. The primary account for recovery is the account or product that the entity has identified as having payment in arrears that is the one which needs to be recovered first. This may be based on entity determination, interest rate, amount, importance, or the like. As such, the system may identify the products with payments in arrears that are the most important to recover first ahead of the other payment products. Thus, the representative may focus on recovering payments for that identified product.

Finally, as illustrated in block 110, the process 100 continues by providing access to a unified application to a representative for customer communications. The unified application provides the representative with an across the entity view of the customer's relationship with the entity as well as information associated with the primary account and other accounts with payments in arrears. The unified application may also use the system and method for the automatic contact list generation in order to develop contact lists that representatives or teams of representatives communicate with efficiently and while complying with business and legal requirements. Finally, the unified application also provides information associated with prior customer communications. As such, the invention provides a holistic customer service experience for a customer with accounts in arrears.

FIG. 2 illustrates a high level process flow for the unified recovery system process 200, in accordance with one embodiment of the present disclosure. The process 200 describes a high level of the unified recovery system's steps for providing a representative with the unified application to aid in payment in arrears recovery. First, as illustrated in block 202, the system compiles the various recovery programs across the entity. In this way, all recovery programs may be centralized, such that the representative can log into a single system. This eliminates requiring the representative to log into a plurality of software programs in order to view and understand all relationships a customer has with the entity.

Next, as illustrated in block 204, the system may determine regulations and internal restrictions associated with individual customer communications. Regulations may include laws, rules, mandates, rulings, judgments, or legal requirements regarding the time of day a customer may be contacted, the amount of times within a given day/week/month that a customer may be contacted, a telephone number in which a customer may be contacted, or the like. The regulations may be enforced, created by, or otherwise associated with a government entity, a private entity, a group of industrial entities, or a combination thereof. As such, the system ensures that the representative is following all regulations and/or laws regarding the contacting of customers with products having payments in arrears. Internal restrictions may include any rule that an entity may put in place to restrict or warn a representative prior to the representative contacting a customer or during the representative's communication with the customer. For example, an internal restriction may be set based on a customer communication preference, such as a specific telephone number to utilize for communications with the customer. In another example, the entity may identify an event that requires the entity to delay in communicating with a customer regarding a product with a payment in arrears (e.g., a natural disaster in the geographic are where the customer is located or another known event that may interfere with a customer providing payment).

In some embodiments, the regulations or restrictions may, in some instances, be overridden by the representative. In this way, the representative may still contact the customer even if a regulation or restriction is in place. The representative may need to input a reason for overriding the regulation or restriction. In some embodiments, the regulation or restriction may not be overridden by any representative. In this way, the system will not allow the representative to communicate with the customer at that time. In some embodiments, no regulation or restriction may be placed on a customer communication. As such, the representative may contact the customer at any time.

Although the regulation and internal restrictions are described herein as placing restrictions on calling parameters, it will be understood that the regulations and internal restrictions may also relate to positive call requirements. For example, some regulations or internal restrictions may require that calls be initiated in certain situations rather than restricting call placement. In some embodiments, the regulations and/or internal restrictions comprise notification requirements. Some regulations, for example, may require that the customer be notified of their rights, balances, or the like via the telephone associated with the account for certain accounts in arrears.

In some embodiments, the regulations and internal restrictions are identified based on one or more contacts associated with an account (e.g., a phone number area code), geographic region associated with an account or contacts associated with the account, account balances, calling history associated with the accounts, types of accounts, account holders, and the like. For example, the area code of a phone number may be used to identify regulations associated with a state, city, or country associated with that phone number. In other examples, certain account balances, types of accounts (mutual funds, loans, credit card accounts, checking accounts, and so forth), or accounts having payment due dates past 90 days may be associated with specific regulations.

Next, as illustrated in block 206 the system creates communication rules and applies the rules to at least one contact associated with individual customers having payments in arrears or at least one contact associated with customer accounts. As used herein, a contact includes, but is not limited to a piece of information that allows a party to communicate with the customer. For example, the contact may be a phone number, e.g., a landline or mobile phone number. The system disclosed herein may be used with various types of contacts, including phone numbers for voice or text messaging, email addresses, private messaging address (such as through a web forum, social network messaging, instant messaging, physical mail, in-person contact, messages provided when logging into merchant websites, messages on ATMs or receipts, and the like.

These rules may be created and applied to a customer on a customer-by-customer or account-by-account basis. In this way, each customer, based on the customer's location, telephone number, or the like, may have a unique set of rules applied for him/her based on regulations and/or restrictions that may apply to the customer having payments in arrears for products. In further embodiments, the communication rules are created and applied directly to the contacts. For example, a home phone number associated with an account may have a different communication rule than a work phone number associated with same account. A first rule may specify that the home phone number can be reached between the hours of 6 PM and 7 PM if the call is related to rewards, whereas a second rule for the work phone number may have criteria that specifies that the work number can be contacted between the hours of noon and 2 PM for all inquiries. Details regarding creating and applying communication rules are described in more detail below.

As illustrated at box 208, at least one indicator is assigned to each of the contacts based on the communication rules. The indicator includes symbols, icons, animations, colors, graphics, or other visual representations, as well as audio sounds, video, or any other indicia that provides information to a user (e.g., a customer representative). Exemplary indicators include tones, beeps, buzzers, vibrations, geometric shapes, signs, alphanumeric texts, traffic symbols, geographic symbols, colors, shading, and/or combinations thereof. In some embodiments, a single indicator may be assigned to the at least one contact based on the parameters of a single rule or multiple rules. For example, a warning sign or other indicator may be used to indicate that placing a call may require the user to override an exception. The exceptions related to the warning sign may be associated with any number of communication rules. Exemplary exceptions and accompanying communication rule parameters are discussed in more detail below with regard to FIGS. 3 and 6.

In other embodiments, the number of indicators assigned to a particular contact is based on the number or type of communication rules that apply to the particular contact, the customer associated with the contacts, or account data associated with the contacts. For example, the system of process 200 may determine, by application of one or more communication rules, that a specific phone number associated with a customer account is available for call placement, and may assign a stoplight-on-green icon to indicate the call availability. In addition to the green traffic signal, the system may also include a pleasant ring or a flash across the screen. The additional indicators may be used in instances where there is a limited window for placing a call to the specific phone number or if the traffic icon or other indicator is small, blurry, or may otherwise be accidentally missed by the customer representative placing the call. Further still, the additional indicators may also be applied to indicate the importance of message associated with the indicator (e.g., do-not-call symbols or symbols connoting urgency) or used during very busy periods. In cases where the customer has held an account for over ten years or has VIP status, an additional indicator may be provided along with the green traffic signal such as a pop-up indicating VIP status or other indicator.

In further embodiments, the system provides a unified application for displaying a customer relationship to an appropriate representative. The unified application has specific regulations, restrictions, and prior customer correspondence associated therewith. In some embodiments, contact lists for calling campaigns, queues, indicators, types of calling modes, are provided to the user via the unified application. An appropriate representative may be identified by the system based on which representative has experience with that particular customer, knowledge with a particular account in arrears, or general expertise regarding a field associated with the primary account for recovery. The system may identify and match the customer with the appropriate representative based on these factors.

Next, as illustrated in block 212 the system may allow the representative to initiate a communication with the customer or prevent customer communication. Allowing or preventing the representative to initiate a communication with a customer may be based on the determined regulations and restrictions. In some embodiments, the regulations and restrictions will not allow a representative to communicate with the customer. In other embodiments, the regulations and restrictions will warn against communicating with the customer. However, a representative may be able to override the warning as discussed in greater detail below. In some embodiments, the regulations and restrictions will allow a representative to communicate with the customer.

Finally, as illustrated in block 214, the system may track and store details regarding the customer communications. In this way, the system may track the disposition of the communication, such as determining if a communication was answered by the customer, a busy signal was received, or that the customer answered the communication. The system may identify the date, time, means of communication (such as specific telephone number, email address, or the like). Furthermore, the system may store any comments or notes made by the representative during the communications.

FIG. 3 illustrates a general process flow 300 for an apparatus or system for generating a contact list and visual representation for permission to contact consistent with an embodiment of the present invention. One or more steps of the processes 100 and 200 may be incorporated into the process 300.

As shown in block 310, the system receives selection criteria for a contact list. A contact list is a list of customers that a representative of an institution (e.g., a financial institution) or a team of representatives will contact. In some embodiments, the contact list is part of a dialing campaign. In an embodiment, the contact list includes an order, such as a first customer to be a contacted, a second customer to be contacted, and the like. In a further embodiment, the contact list is not ordered. That is, while the contact list may include a plurality of customers, there is no reason or intention to contact the customers in a specific order.

The contact list may also information related to the customer. For example, the contact list may include financial account information, e.g., balances, debits, delinquencies, amounts in arrears, and the like. Additionally, the contact list may include demographic information, communication information, preferences, and other information relating to the customer and interactions between the customer and the institution. With respect to preferences, the contact list may include the customer's preferences, such as preferred name, preferred times to contact, and preferred language.

A contact list is used to assist in communicating with customers, such as in an automatic dialing campaign. The contact list may be portable, such that the contact list can be implemented on various communication devices (e.g., an automatic dialer, a voicemail campaign, an email campaign, a direct mail campaign, and the like). In another embodiment, the contact list is specific to a particular channel, such as a telephone dialer or an email manager.

Selection criteria are requirements and/or preferences determined by the entity (e.g., a manager or representative) requesting the contact list. For example, a representative may request a contact list comprising Spanish-speaking customers associated with a specific type of category. The selection criteria are selected by the user and input into the system via a graphical user interface.

Selection criteria may include any type of criteria associated with customers, the representatives making the contact, and/or the financial institution. For example, selection criteria may relate to one or more of customer accounts, customer balances, length of time in arrears, customer preferences, representative characteristics, and the like. In one example, the selection criteria are designed to develop a contact list that includes customers sharing one or more characteristics. In this manner, goals of the institution can be met by efficiently communicating with customers on a related topic. For example, the institution may desire to communicate with customers having a specific account more than thirty days in arrears. The user can input these selection criteria, e.g., specific account type and more than thirty days in arrears, into the system in order to begin the process of developing a contact list. As should be understood, a wide variety of selection criteria associated with customer data, including demographics, financial records, bill pay history, transaction types, payment channels, and the like may be used to develop selection criteria.

In block 320, the system receives data associated with a plurality of customers based on the selection criteria, wherein each customer is associated with at least one contact. A plurality of customers is more than one customer. In some embodiments, the customer is a customer of the merchant, e.g., the financial institution communicating with the customer. The customer may have an account or relationship with the merchant. For example, the customer may have a credit card or line of credit with the merchant. In some embodiments, the merchant is communicating with the customer regarding accounts in arrears or discussing recovery of payment in arrears. In further embodiments, the customer is a customer of a third party associated with the merchant. For example, the merchant may be contracted to communicate with the customer by the third party. In a still further embodiment, the customer is a potential customer of the merchant or a third party. The customer may be an individual or an entity such as a business, non-profit, or governmental entity. The customer may have multiple contacts and multiple accounts with the merchant.

The data received may be data associated with the customer's account history, such as records relating to accounts in arrears, demographic information, account numbers, and the like. The data are received over a network and from data sources such as databases associated with a financial institution. The data are used to develop the contact list, such as by determining whether the customer meets the selection criteria.

In some embodiments, the contact is provided by the customer. For example, the customer may enter a phone number into a form when applying for an account. The customer may provide an email address when registering for electronic statements. In further embodiments, the contact is retrieved by the system. For example, the system may determine that a newly opened account does not have a contact phone number associated with it but that the account is related to another account having an associated phone number. The system may also retrieve contacts from publicly-available information, such as databases of contacts for customers, social networks, or the like.

In some embodiments, the contact is determined automatically by the system. For example, the contact may be determined based on criteria associated with the customer. If the customer has an account in arrears, the contact may be determined by the system after search criteria identifies the account in arrears. In some embodiments, the contact is identified based on search criteria entered by an administrator or representative. For example, the administrator may be creating an autodial campaign or other campaign for phone numbers based on location, account characteristics, and the like. The system to determine permission to contact can act in the background to provide only those contact phone numbers, which the system has permission to contact to the administrator. In this embodiment, search criteria are used to create an autodial list comprising contacts which the system has permission to contact. In other embodiments, the contact list can be used in manual dialing campaigns and may include at least a portion of the contacts available to the system. For example, even contacts that lack permission may be included in manual or semi-manual dialing campaigns. In such embodiments, contacts are assigned indicators.

In additional embodiments, dialing campaigns are based on one or more call modes. The call modes includes inward call modes, outward call modes, an autopace mode, a view first mode, a manual dial mode, a browse mode, and combinations thereof. In the view first mode, outward calls are automatically initiated directly from the user's desktop when an account is launched by the user using the unified application after a predetermined delay. As such, the view first mode has both automated and manual aspects because the user can set the delay time for reviewing the account and the user can also determine the dialing order for each account (e.g., home number first, work number second, and so forth). Further, because the outward call is initiated from the user's desktop in the view first mode, this mode of dialing is not considered to be an automated dialer and may fall outside of the scope of some government regulations related to automated dialers.

The inward call modes and outward call modes, in some embodiments, are automated and/or manual. For example, the manual dial mode may include inward calls and/or outward calls. The autopace mode, in some embodiments, includes automated outward dialing. For example, a virtual dialer may automatically dial one or more numbers for each account in a queue such that the operator talking to the customer has no input with regard to the timing of the dialing, the order of dialing, and so forth. In other examples, the dialing campaign in the autopace mode includes only recorded messages to increase efficiency for dialing campaigns in the autopace mode. The manual dial mode allows a user to receive inward calls or place outward calls manually. In further embodiments, the browse mode enables trainees, managers, or administrators to review calling modes, queues, user actions, accounts, and the like without actually participating in a dialing campaign (i.e., receiving or placing calls).

In block 330, the system determines contacts being locked. The system evaluates each contact for the selected customers and determines if the contact, customer, and/or an account associated with the customer is already being contacted. For example, the system will not include a contact on the list if a representative from the financial institution is currently contacting the customer. In some embodiments, the contact is locked if a representative is on the call with the customer. In an embodiment, all contacts for a customer are locked if a representative is currently on the call. In some embodiments, a contact is locked if the contact has been assigned to another contact list via the system but has not yet been contacted.

In an embodiment, the system determines contacts that are locked by comparing the contacts associated with the selected customers to contacts that are currently being worked by the communication system.

In additional embodiments, as further illustrated at block 330, a first indicator is assigned to the locked contacts. The first indicator indicates, in some embodiments, that a representative cannot initiate a call or otherwise contact the locked contacts. The user may not be able to initiate a call based on the locked contact for a temporary or permanent period of time. Exemplary first indicators a negative symbols such as a minus sign or the letter "x," a red-stop light traffic icon, a stop sign, the color red, a buzzer sound, and so forth. In other embodiments, the first indicator provides a quick visual display as to whether the user should expect a calling warning window. For example, if the user attempts to dial a locked contact, a pop-window displaying a warning or other message that the account is locked may be displayed.

In block 340, the system identifies contacts related to external requests. An external request is a request from the customer, a third party, or an individual associated with the financial institution. In this manner, external mean automatically determined by the system. The external request may be, for example, a request from a customer or attorney to not contact someone, a request to not contact a specific phone number because the contact is incorrect for a specific customer (e.g., the phone number has changed), a cease and desist letter received by the institution, channel specific requests not to contact, contacts associated with the institution itself, specific types of contacts such as phone numbers that incur a per minute charge, 1-800 numbers, general contact numbers for businesses with many employees, and the like.

The external request may be received through various channels based on the reason for being excluded from the contact list. For example, cease and desist letters may be received by another entity in the institution, which then communicates this information to the system. A request from a customer, however, may be communicated directly from the customer during a phone call and the representative can then update the customer's or contact's record to indicate the request.

In some embodiments, the order that the iterative process occurs is important because customers can be excluded or assigned an indicator quickly and while using less processing power based on narrow exclusion criteria than based on broad exclusion criteria. For example, many contacts may be assigned a particular indicator based on external requests compared to the number of contacts that are excluded based on locking. In this situation, the system may first evaluate the selected customers based on external requests and then evaluate the customers based on locking in order to more quickly eliminate customers.

In decision block 345, the system determines whether an exception is allowable. An exception is an override to the rule that a contact should not receive any communications from the system or user.

The user may allow an exception as a batch process for the entire list. For example, the user may determine that all external requests generated by the financial institution in order to roll out a new product may be overridden in order to communicate with the customers. In this manner, general exceptions can be input onto a list to increase the number of customers that may be contacted. In another embodiment, however, exceptions are contact, customer, and/or account specific and are entered by the user for only the specific contact, customer, and/or account.

In an embodiment, any type of exception may be a reason for not excluding a contact from the contact list or for enabling a user to communicate with the customer using the external request contacts. For example, a customer may have asked a representative to call the customer at a number that the customer previously submitted to a do not call registry. Other examples of exceptions to exclusion based on external requests include system issues, changes in policies, changes in external requests, and the like.

In an embodiment, every exception is tracked and the user inputting the exception is required to give a reason why the exception is being allowed. These reasons are saved in a database along with the record of the communication. In an embodiment, the system develops a graphical user interface, such as a drop down list, the system provides permissible reasons for exceptions to the user and assists the user is selecting the reason. In a further embodiment, the system tailors the drop down list to the reasons why the contact may be excluded.

As illustrated at block 347, a second indicator is assigned to the external request contacts if an exception with respect to external request contacts is allowed. In some cases, the second indicator includes a warning symbol that indicates that the user should proceed with caution and that placing a call requires inputting an exception. In some embodiments, the second indicator is the same as the first indicator. In other embodiments, the second indicator and the first indicator are different. For example, the second indicator may be a yellow warning sign whereas the first indicator may be a red sign. The second indictor, in further embodiments, indicates that caution should be used before placing a call.

If a user does not enter the exception, if the exception is not approved by the system (e.g., invalid reasons for placing the call), and/or if the exception is not otherwise allowable, the contact being evaluated is assigned the first indicator as shown in block 395.

Turning now to block 350, the system determines contacts associated with specific geography. For example, an institution may determine that customers in a specific geographic region should not be contacted. The customers in the geographic region may be having a holiday or may have had an incident that results in a business decision to not contact customers having accounts in arrears. Similarly, governmental regulations may inform the system that customers should not be contacted within a specific region. For example, a federal agency such as the Federal Emergency Management Agency (FEMA) may provide examples of geographic areas (e.g., zip codes) that are under emergency conditions.

The location of the customer, account, and/or contact may be determined based on the mailing address associated with the contact, with demographic data provided by the customer, based on a geopositioning device such as a GPS, by state, by an area code or network address, or the like. The location of the customer may be permanent, such as a mailing address on an account, or temporary, such as an IP address.

When the customer is located in a specific geography that is prohibited by the system, the rules specify that communication with such contacts is prohibited. The system may cross-reference a database with geographies that are currently under prohibition from being contacted. After determining the customer or contact's location, the system cross-references the database to determine if the system is capable or allowed to communicate with customers using the geography based contacts.

In decision block 355, the system determines if an exception based on geography is allowable. As discussed, the exception allows a contact or customer to remain in the pool of customers that are being considered for the contact list. Exceptions that may occur when evaluating customers based on geography include changing conditions in the location, changing rules, and the like. Exceptions from other general categories in the iterative process may also apply with respect to geography. For example, the customer may request a phone call in an area under a geographic restriction, overriding the policy against calling customers in the geographic area based on the customer's request.

If the system determines that the exception is allowable, a third indicator is assigned to the geography contacts as illustrated at block 357. In some cases, the third indicator includes a warning symbol or other indicator that indicates that the user should proceed with caution and that placing a call requires inputting an exception before the customer can be contacted. The second indicator and the third indicator may be the same or different. If a user does not enter the exception, if the exception is not approved by the system (e.g., invalid reasons for placing the call), and/or if the exception is not otherwise allowable, the contact being evaluated is assigned the first indicator as shown in block 395.

In block 360, the system identifies contacts associated with a time period. In an embodiment, some contacts may only be contacted between certain hours and/or on certain days. For example, phone numbers may only be called between the hours of 9 am and 5 pm on Mondays through Fridays. The time restriction may be based on federal regulations, state regulations, or business policy. In an embodiment, the customer or contact may have multiple times associated with it. For example, a phone number may have an area code in a first time zone and a billing address in a second time zone. The permissible time to call this phone number may be determined as a blend of both time zones, e.g., between 11 am and 3 pm. In another embodiment, the system prevents contact with a customer at a time known to be inconvenient, whether from communication with the customer or in general.

The system determines permissible time to contact based on data associated with the customer, contact, or account. For example, the timezone may be determined based on the billing address, the zip code, a geographic location of the customer based on a geopositioning system in the user's mobile device, an IP address or network address, an input from the user, and the like.

The system determines the user's local time, compares the user's local time to a permissible time to call based on a database of permissible times to call, and excludes customers if the customer is in a timezone that is impermissible to contact at the current time.

In decision block 365, the system determines if an exception is allowable based on time. As discussed, exceptions may be permissible for various reasons, including a request of the customer, a change in time zones of the customer, a change in laws or regulations, and the like. The user of the system may input the exception as a batch process, individually for customers or contacts, or based on other criteria, such as triggers associated with customer accounts. A trigger may be a request for an updated mailing address or the like.

As illustrated at block 367, a fourth indicator is assigned to the time based contacts if the exception is allowable. In some embodiments, the fourth indicator includes any number of indicators that indicate that the user should proceed with caution and that placing a call requires inputting an exception before the call can be placed via a time based contact. Each of the second, third, and fourth indicators may be identical to at least one other indicator or different from some or all of the other indicators. If a user does not enter the exception, if the exception is not approved by the system (e.g., invalid reasons for placing the call), and/or if the exception is not otherwise allowable, the contact being evaluated is assigned the first indicator as shown in block 395.

In block 370, the system identifies contacts associated with a velocity. As used herein, velocity is a measurement of frequency of contact. Numerous measures of velocity are possible. For example, the number of phone calls in a 24 hr period or the number of phone calls in a day may be measured by the system.

Federal, state, and local authorities may have restrictions on the frequency with which a customer in arrears may be contacted. Additionally, business decisions may control the number of times and/or the frequency with which a customer is contacted at one or more contacts. For example, the number of customer contacts within a predetermined time period may be capped at a maximum. In an embodiment, an attempted contact is still considered a contact. For example, a phone call to a customer that does not reach the customer is still considered a contact because the missed call shows up on the customer's phone.

The system tracks the frequency of contacts for each customer and compares the frequency to the permissible frequency to determine if the user is at the limit of permissible calls within a predetermined time period. Once the customer has been contacted the permissible number of times in the time period, the customer and all associated contacts are excluded from the contact list until a new time period is considered.

In block 375, the system determines if an exception is allowable based on velocity. The exception may be because the customer requested a call on a more frequent basis or other reasons. If the exception is allowable, a fifth indicator is assigned to the velocity based contacts as illustrated at block 377. In some embodiments, the fifth indicator includes any number of indicators that indicate that the user should proceed with caution and that placing a call requires inputting an exception before the call can be placed via a time based contact. Each of the second, third, fourth, and fifth indicators may be identical to at least one other indicator or different from all or some of the other indicators. If a user does not enter the exception, if the exception is not approved by the system (e.g., invalid reasons for placing the call), and/or if the exception is not otherwise allowable, the contact being evaluated is assigned the first indicator as shown in block 395.

In block 380, the system identifies contacts associated with one or more permissions to contact. In some embodiments, the system requires permission to contact a customer before the customer can be added to a contact list. For example, the institution may have a policy that the customer must provide permission before being contacted. In another embodiment, permission is required in order to be contacted via a specific channel, such as social media contacts. In a still further embodiment, permission is required based on federal laws. In 1991, the Telephone Consumer Protection Act (TCPA) was passed by the United Stated Congress and signed into law. One provision of the TCPA prevents automated telephone equipment from dialing any telephone number assigned to a paging service, cellular telephone service, specialized mobile radio service, or other radio common carrier service, or any service for which the called party is charged for the call without the prior express consent of the called party.

The system determines whether permission is required for a customer based on analysis of data associated with the customer and based on the channel via which the customer is being contacted. For example, the system may determine whether permission has been received and whether the contact associated with the selected customer is a contact channel that requires permission. If permission is required but not documented as received by the system, the customer is excluded from the contact list.

In block 385, the system determines if an exception is allowable based on the one or more permissions to contact. If the restriction on contacting is based on federal laws, then the system will not allow an exception. If the restriction is based on business policy, then the system will prompt the user to enter a reason for the exception and allow the customer to be added to the contact list. Further, as illustrated at block 387, a sixth indicator is assigned to the permission-to-contact contacts. In some embodiments, the fifth indicator includes any number of indicators that indicate that the user should proceed with caution and that placing a call requires inputting an exception before the call can be placed via a time based contact. Each of the second, third, fourth, fifth, and sixth indicators may be identical to at least one other indicator or different from all or some of the other indicators. If a user does not enter the exception, if the exception is not approved by the system (e.g., invalid reasons for placing the call), and/or if the exception is not otherwise allowable, the contact being evaluated is assigned the first indicator as shown in block 395.

In block 397, the system generates the contact list. In some embodiments, the contact list includes all of the contacts discussed hereinabove, including identified contacts having any one of the first, second, third, fourth, fifth, and/or sixth indicators assigned to them. In some embodiments, the contact lists includes contacts that have not been assigned indicator. In other embodiments, all of the contacts in the contact list include at least one indicator including contacts that have not been evaluated for communication status. In such cases, the indicator may be in the form of a question mark or other indicator. In some embodiments, all contacts are included the contact list, even contacts that cannot be used by the system to communicate with the system (e.g., the contacts labeled with the first indicator). In such embodiments, the contact list is used in dialing campaigns associated with the manual dialing mode or a hybrid dialing mode discussed above. In situations where there are contacts that are not identified as being locked, associated with the external requests, associated with the geography, associated with the time period, associated with the velocity, and/or associated with the one or more permission to contact, such contacts may be automatically assigned a positive indicator. For example, contacts that are not associated with any hindrances, regulations, or restrictions may be assigned a green color, a check mark, and the like.

In other embodiments, a contact list is generated based on customers that are not excluded based on exclusion criteria. After one or more of the steps in the iterative process completes, the system determines the contact list based on the selected customers meeting the selection criteria and not excluded based on the iterative checks.

The contact list is used to assist automatic dialers and/or manual dialers in communicating with a pool of customers. As discussed, the selection criteria allow the pool of customers to share one or more attributes and be efficiently targeted by representatives of the institution, such as a contact list of customers whose preferred language is Spanish being contacted by Spanish-speaking representatives.

The contact list may be used for a variety of reasons including discussion of accounts in arrears, offers, advertisements, and the like.

FIG. 4 provides a block diagram illustrating an exemplary financial institution banking system 400 in greater detail, in accordance with embodiments of the invention. The banking system 400 may be the merchant system that provides for the system and method disclosed in FIGS. 1-3. As illustrated in FIG. 4, in one embodiment of the invention, the banking system 400 includes a processing device 420 operatively coupled to a network communication interface 410 and a memory device 450. In certain embodiments, the banking system 400 is operated by a first entity, such as a financial institution, while in other embodiments the banking system 400 is operated by an entity other than a financial institution.

It should be understood that the memory device 450 may include one or more databases or other data structures/repositories. The memory device 450 also includes computer-executable program code that instructs the processing device 420 to operate the network communication interface 410 to perform certain communication functions of the banking system 400 described herein. For example, in one embodiment of the banking system 400, the memory device 450 includes, but is not limited to, a network server application 470, a customer account data repository 480, which includes customer account information 484, a decision engine 490, an contact list routine 492, and other computer-executable instructions or other data. The computer-executable program code of the network server application 470 or the contact list routine 492 may instruct the processing device 420 to perform certain logic, data-processing, and data-storing functions of the banking system 400 described herein, as well as communication functions of the banking system 400.

In an embodiment, the customer account data repository 480 includes customer account information 484. The customer account information may include account history for the customer, demographic information for the customer, any notations made by the customer or a representative on the customer's file, and the like.

In some embodiments, the contact list routine 492 determines a list of selected customers based on selection criteria, conducts the iterative process of evaluating selected customers based on one or more criteria, and assigning indicators. In an embodiment, the contact list routine 492 receives the selection criteria from a user and evaluates the customer information in the customer account data repository 480. The contact list routine 492 then evaluates the customer account information 484 to assign indicators to contacts, and determines a contact list, as disclosed in FIG. 3.

As used herein, a "communication interface" generally includes a modem, server, transceiver, and/or other device for communicating with other devices on a network, and/or a user interface for communicating with one or more users. Referring again to FIG. 4, the network communication interface 410 is a communication interface having one or more communication devices configured to communicate with one or more other devices on the network, such as a representative work station, an autodialer, a customer contact, and the banking system 400. The processing device 420 is configured to use the network communication interface 410 to transmit and/or receive data and/or commands to and/or from the other devices connected to a network to allow communication between the devices.

FIG. 5 provides a block diagram illustrating technical components for a system 500 for providing a workflow rules engine, in accordance with an embodiment of the present disclosure. As illustrated, the system 500 includes a customer 510, a merchant computer platform 520, a representative workstation 530 for a representative 512 and a network 540. It will be understood that the representative 512 has access to the representative workstation 530.

As shown in FIG. 5, the merchant computer platform 520 and representative workstation 530 are each operatively and selectively connected to the network 540, which may include one or more separate networks. In addition, the network 540 may include a local area network (LAN), a wide area network (WAN), and/or a global area network (GAN), such as the Internet. It will also be understood that the network 540 may be secure and/or unsecure and may also include wireless and/or wireline technology. The network 540 may be used to communicate with the customer 510 via the contact.

As shown in FIG. 5, in accordance with some embodiments of the present invention, the representative workstation 530 includes a communication interface 532, a processor 533, a memory 534 having a pop-up routine 535 stored therein, an autodialer or a connection to an autodialer 536, and a user interface 537. In such embodiments, the communication interface 532 is operatively and selectively connected to the processor 533, which is operatively and selectively connected to the user interface 537, the memory 534 and the autodialer 536.

The user interface 537 may allow the representative workstation 530 to receive data from the customer 510. In an embodiment, the representative workstation 530 may include any of a number of devices allowing the representative 512 to control the representative workstation 530 and communicate with the customer 510, such as a keypad, keyboard, touchscreen, touchpad, microphone, mouse, joystick, stylus, other pointer device, button, soft key, and/or other input device(s). In some embodiments, the user interface 537 also includes one or more user output devices, such as a display and/or speaker, for presenting information to the representative 512.

Each communication interface described herein, including the communication interface 532 and 522, generally includes hardware, and, in some instances, software, that enables a portion of the system 500, such as the processor 533 to transport, send, receive, and/or otherwise communicate information. For example, the communication interface 532 of the representative workstation 530 may include a modem, server, electrical connection, and/or other electronic device that operatively connects the representative workstation 530 to another electronic device, such as the electronic devices that make up the merchant computer platform 520 and/or the electronic device of the customer 510.

Each processor described herein, including the processor 533 and 524, generally includes circuitry for implementing the audio, visual, and/or logic functions of that portion of the system 500. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as the memory 534 of the representative workstation 530 and the memory 526 of the merchant computer platform 520.

Each memory device described herein, including the memory 534 for storing the pop-up routine 535 and the memory 526 of the merchant computer platform 520, may include any computer-readable medium. For example, memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 5, the memory 534 of the representative workstation 530 includes the pop-up routine 535. The pop-up routine 535 provides an opportunity for the representative 512 to enter exceptions to rules that exclude selected customers from the contact list. The pop-up routine 535 also provides alerts and/or information to the representative relating to the customer, the contact, or the call. For example, the pop-up routine may determine that the customer resides in a state having restrictions on certain questions during a phone call from a financial institution. The pop-up routine would display a special screen before or during the communication with the customer providing information on the restrictions. In some embodiments, the pop-up routine 535 includes computer-executable program code portions for instructing the processor 533 to perform one or more of the functions of the pop-up routine 535 described and/or contemplated herein.

It will be understood that the representative workstation 530 can be configured to implement one or more portions of the process flows described and/or contemplated herein. For example, in some embodiments, the representative workstation 530 is configured so that the communication interface 532 is operatively and selectively linked to the merchant computer platform 520 to receive autodialing or other campaigns or connect to an autodialer. For instance, information regarding the customers that will be contacted during an autodialing campaign, e.g. contacts, account history, or the like. In other embodiments (not shown) an application may be stored in the memory 534 of the representative workstation 530 that enables the workstation to perform some or all of the steps of process flows 300 shown in FIG. 3.

FIG. 5 also illustrates a merchant computer platform 520, in accordance with an embodiment of the present invention. The merchant computer platform 520 may include any computerized apparatus that can be configured to perform any one or more of the functions of the merchant computer platform 520 described and/or contemplated herein. In accordance with some embodiments, for example, the merchant computer platform 520 may include an engine, a platform, a server, a database system, a front end system, a back end system, a personal computer system, and/or the like. In some embodiments, such as the one illustrated in FIG. 5, the merchant computer platform 520 includes a communication interface 522, a processor 524 and a memory 526. In some embodiments, as illustrated in FIG. 5, customer data (such as contacts, transactional data, account history data, social network data and Internet data) 484, a decision engine 490 for evaluating selection criteria, assigning indicators to contacts, and determining contact lists, and an contact list routine 492 may be stored in memory 526. The customer data 484 may have been previously collected and stored in the memory 526 of the merchant computer platform 520, or the merchant computer platform may actively collect customer data 484 by using the communication interface 522 to access the network 540 and only temporarily saves the customer data 484 to the memory to be accessed by the processor 524. The communication interface 522 is operatively and selectively connected to the processor 524, which is operatively and selectively connected to the memory 526.

It will be understood that the merchant computer platform 520 can be configured to implement one or more portions of the process flows described and/or contemplated herein. For example, in some embodiments, the merchant computer platform 520 is configured so that the processor uses a decision engine 490 to determine the contact list and then instructs the autodialer to communicate with the customer on the contact list via the contact. In certain embodiments the contact list routine 492, stored in memory 526, is configured to control an autodialer 536. The autodialer may be integral with the system or may be external to the system yet connected over the network 540.

It will be understood that the embodiment illustrated in FIG. 5 is exemplary and that other embodiments may vary. For example, in some embodiments, some or all of the portions of the system 500 may be combined into single portion. Specifically, in some embodiments, the merchant computer platform 520 is configured to perform all of the same functions of those separate portions as described and/or contemplated herein. Likewise, in some embodiments, some or all of the portions of the system 500 may be separated into two or more distinct portions.

Referring now to FIG. 6, exemplary indicators are shown in a graphical user interface (GUI) 610 of at least a portion of a display of a computing device of a customer representative. In the illustrated embodiment, the GUI 610 includes a first tab for displaying primary information, a second tab for displaying secondary information, and a third tab related to customer demographics. Under the primary information tab, customer information is displayed, including a button for indicating whether multiple accounts are associated with the selected customer. A customer representative or other user may click on the multiple accounts button to view each account associated with the selected customer.

Also included in FIG. 6 is a button for indicating whether the customer is locked. For example, if the customer is currently talking with another representative, the customer, the account, or contacts associated with the customer will be locked. In some embodiments, a comment box (not shown) identifying the individual responsible for the locked state is placed on or near the locked button. If the user places a call to the customer's home phone number, for example, that home phone number may be automatically locked. In the illustrated embodiment, the customer is not locked.

Further illustrated in the GUI 610 of FIG. 6 is a list of phone numbers associated with the customer. The home phone number of the customers includes an indicator represented as a circle having a check marked positioned therein. In some embodiments, the circular background is green, and the checkmark is white. The green color serves to reinforce the instructions associated with the checkmark indicator. In this embodiment, the indicator next to the home phone number indicates that the user is allowed to initiate a call to the customer using customer's home phone number. Further illustrated is an indicator associated with a business phone number, where the business phone indicator is the same as the home phone indicator. Also provided in the phone number list is a phone number labeled as "other." The other phone number may include a mobile phone number, a phone number associated with a joint account owner, and the like. The indicator next to the other phone number is a warning symbol represented by an exclamation point inserted into the middle of a yellow triangle that the user should be proceed with caution (e.g., placing a call using the other phone number may require the user to input an exception). In other embodiments, each of the phone numbers may be alternatively or additionally assigned other indicators. For example, instead of a check mark symbol, the home phone number may be displayed in a green font, highlighted green, larger font, bold font, underscore, and the like. In certain cases where the indicator indicates a communication protocol that is especially urgent or important, a flash, beep, shaking animation of the GUI 610, and the like may also be displayed to the representative. In addition to the color codes, the indicators in FIG. 6 also include symbols such as the check mark, the exclamation point, "X," and the question mark so that representatives who are color blind easily determine the type of status associated with each indicator.

When the user clicks on any one of the indicators in the phone number list, a pop-up window 620 that includes an indicator key is displayed. As shown in FIG. 6, the pop-up window 620 includes an explanation for each indicator. For example, if a phone number is associated with an icon that includes a white "x" positioned in a red circle, the user knows that the call cannot be placed for any number of reasons such as government regulation restrictions, velocity limits, customer requests, and so forth. Further, a question mark symbol is used to indicate that calling eligibility could not be determined. In some embodiments, all phone numbers for any selected customer or customer account includes question mark indicators in a browse call mode. This is because the system may be off-line in a browse call mode, or because the browse call mode is used for review and training and is not used for initiating customer calls.

Further illustrated in FIG. 6 is a details button. When a user selects the details button, further information concerning the customer is displayed such as velocity data associated with each phone number, calling history, additional contacts, and the like. Additionally, a refresh button allows the user to update the information displayed in GUI 610, including the indicators associated with each phone number.

Embodiments of the present invention are described herein with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer.

Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other updates, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for assigning visual representation to contacts, the system comprising:
   a computer apparatus including a processor and a memory; and
   a software module stored in the memory, comprising executable instructions that when executed by the processor cause the processor to:
   receive selection criteria;
   identify data associated with a plurality of customers meeting the selection criteria, wherein each of the customers is associated with one or more contacts;
   determine that at least one contact associated with each customer comprises one or more contact statuses; and
   assign one or more indicators to the at least one contact based on the one or more statuses, wherein the one or more statuses include at least one of a contact locked status, a contact external request status, a contact geography status, a contact time period status, a contact velocity status, and a permission-to-communicate status; and
   determine whether the one or more indicators assigned to the at least one contact indicates a communication restriction, said determining comprising:
   identifying a requirement to receive permission associated with the customer for communication with the at least one contact;
   determining whether permission has been received from the customer; and
   determining that communication with the at least one contact is restricted when permission from the customer to communicate with the at least one contact has not been received, wherein the one or more indicators assigned to the at least one contact indicates the communication restriction.

2. The system of claim 1, wherein the executable instructions further cause the processor to:
   assign a first indicator to a first contact of a first account based on the first contact being locked;
   assign a second indicator to a second contact of the first account based on an external request associated with the second contact; and
   assign a third indicator to a third contact of the first account based on a velocity range of the third account.

3. The system of claim 2, wherein each of the second indicator and the third indicator comprise the same visual representation and the first indicator comprises an auditory indicator.

4. The system of claim 1, wherein at least one of the one or more indicators indicates that communicating with a customer via the first contact is prohibited.

5. The system of claim 4, wherein the executable instructions further cause the processor to:
   allow a user to select an exception for the communication prohibition from a user;
   prompt the user to enter a reason for the exception; and
   allow the user to communicate with at least one of the plurality of customers based on the exception.

6. The system of claim 1, wherein at least one of the one or more indicators indicates that communicating with a customer via the first contact is allowed.

7. The system of claim 1, wherein the selection criteria are based on a characteristic of the customers.

8. The system of claim 1, wherein the executable instructions further cause the processor to:

determine a location associated with the customer;
compare the location associated with the customer with a database of currently prohibited locations; and
determine that communication with the at least one contact is restricted based on the comparison between the location of the customer and the database of currently prohibited locations.

9. The system of claim 1, wherein the executable instructions further cause the processor to:
determine a time period associated with the customer;
compare the time associated with the customer with a database of currently prohibited times;
determine that communication with the at least one contact is restricted based on the comparison between the location of the customer and the database of currently prohibited locations.

10. The system of claim 1, wherein the executable instructions further cause the processor to:
determine a frequency of contact associated with the customer;
compare the frequency of contact associated with the customer with a database of currently prohibit frequencies; and
determine that communication with the at least one contact is restricted based on the comparison between the frequency of contact of the customer and the database of currently prohibited frequencies.

11. A computer program product for assigning visual representation to contacts, the computer program product comprising:
a non-transitory computer readable storage medium having computer readable program code embodied therewith, the computer readable program code comprising:
a computer readable program code configured to receive selection criteria;
a computer readable program code configured to identify data associated with a plurality of customers meeting the selection criteria, wherein each of the customers is associated with one or more contacts;
a computer readable program code configured to determine that at least one contact associated with each customer comprises one or more contact statuses;
a computer readable program code configured to assign one or more indicators to the at least one contact based on the one or more statuses, wherein the one or more statuses include at least one of a contact locked status, a contact external request status, a contact geography status, a contact time period status, a contact velocity status, and a permission-to-communicate status;
a computer readable program code configured to determine whether the one or more indicators assigned to the at least one contact indicates a communication restriction, said determining comprising:
identifying a requirement to receive permission associated with the customer for communication with the at least one contact;
determining whether permission has been received from the customer; and
determining that communication with the at least one contact is restricted when permission from the customer to communicate with the at least one contact has not been received, wherein the one or more indicators assigned to the at least one contact indicates the communication restriction.

12. The computer program product of claim 11, the computer program product further comprising a computer readable program code configured to assign a first indicator to a first contact of a first account based on the first contact being locked; assign a second indicator to a second contact of the first account based on an external request associated with the second contact; and assign a third indicator to a third contact of the first account based on a velocity range of the third account.

13. The computer program product of claim 11, wherein at least one of the one or more indicators indicates that communicating with a customer via the first contact is prohibited.

14. The computer program product of claim 13, the computer program product further comprising a computer readable program code configured to allow a user to select an exception for the communication prohibition from a user; prompt the user to enter a reason for the exception; and allow the user to communicate with at least one of the plurality of customers based on the exception.

15. The computer program product of claim 11, wherein at least one of the one or more indicators indicates that communicating with a customer via the first contact is allowed.

16. A computer implemented method for assigning visual representation to contacts, the method comprising:
receiving selection criteria;
identifying, by a processor, data associated with a plurality of customers meeting the selection criteria, wherein each of the customers is associated with one or more contacts;
determining, by a processor, that at least one contact associated with each customer comprises one or more contact statuses;
assigning, by a processor, one or more indicators to the at least one contact based on the one or more statuses, wherein the one or more statuses include at least one of a contact locked status, a contact external request status, a contact geography status, a contact time period status, a contact velocity status, and a permission-to-communicate status; and
determining whether the one or more indicators assigned to the at least one contact indicates a communication restriction, said determining comprising:
identifying a requirement to receive permission associated with the customer for communication with the at least one contact;
determining whether permission has been received from the customer; and
determining that communication with the at least one contact is restricted when permission from the customer to communicate with the at least one contact has not been received, wherein the one or more indicators assigned to the at least one contact indicates the communication restriction.

17. The method of claim 16, the method further comprising:
assigning, by a processor, a first indicator to a first contact of a first account based on the first contact being locked;
assigning, by a processor, a second indicator to a second contact of a second account based on an external request associated with the second contact; and
assigning, by a processor, a third indicator to a third contact of the first account based on a velocity range of the third account.

18. The method of claim 16, wherein at least one of the one or more indicators indicates that communicating with a customer via the first contact is prohibited.

19. The method of claim 16, wherein at least one of the one or more indicators indicates that communicating with a customer via the first contact is allowed.

20. A system for assigning visual representation to contacts, the system comprising:
- a computer apparatus including a processor and a memory; and
- a software module stored in the memory, comprising executable instructions that when executed by the processor cause the processor to:
  - receive selection criteria;
  - identify data associated with a plurality of customers meeting the selection criteria, wherein each of the customers is associated with one or more contacts;
  - determine that at least one contact associated with each customer comprises one or more contact statuses;
  - assign one or more indicators to the at least one contact based on the one or more statuses, wherein the one or more statuses include at least one of a contact locked status, a contact external request status, a contact geography status, a contact time period status, a contact velocity status, and a permission-to-communicate status, and wherein at least one of the one or more indicators indicates that communicating with a customer via the first contact is prohibited;
  - receive an exception associated with the communication prohibition prohibiting contact with a customer, wherein receiving further comprises receiving a reason for the exception; and
  - enable communication with at least one of the plurality of customers based on at least receiving the exception and the reason for the exception.

21. A computer program product for assigning visual representation to contacts, the computer program product comprising:
- a non-transitory computer readable storage medium having computer readable program code embodied therewith, the computer readable program code comprising:
- a computer readable program code configured to receive selection criteria;
- a computer readable program code configured to identify data associated with a plurality of customers meeting the selection criteria, wherein each of the customers is associated with one or more contacts;
- a computer readable program code configured to determine that at least one contact associated with each customer comprises one or more contact statuses; and
- a computer readable program code configured to assign one or more indicators to the at least one contact based on the one or more statuses, wherein the one or more statuses include at least one of a contact locked status, a contact external request status, a contact geography status, a contact time period status, a contact velocity status, and a permission-to-communicate status, and wherein at least one of the one or more indicators indicates that communicating with a customer via the first contact is prohibited;
- a computer readable program code configured to receive an exception associated with the communication prohibition prohibiting contact with a customer, wherein receiving further comprises receiving a reason for the exception; and
- a computer readable program code configured to enable communication with at least one of the plurality of customers based on at least receiving the exception and the reason for the exception.

22. A computer implemented method for assigning visual representation to contacts, the method comprising:
- receiving selection criteria;
- identifying, by a processor, data associated with a plurality of customers meeting the selection criteria, wherein each of the customers is associated with one or more contacts;
- determining, by a processor, that at least one contact associated with each customer comprises one or more contact statuses; and
- assigning, by a processor, one or more indicators to the at least one contact based on the one or more statuses, wherein the one or more statuses include at least one of a contact locked status, a contact external request status, a contact geography status, a contact time period status, a contact velocity status, and a permission-to-communicate status, and wherein at least one of the one or more indicators indicates that communicating with a customer via the first contact is prohibited;
- receiving an exception associated with the communication prohibition prohibiting contact with a customer, wherein receiving further comprises receiving a reason for the exception; and
- enabling communication with at least one of the plurality of customers based on at least receiving the exception and the reason for the exception.

* * * * *